(12) United States Patent
Ketchum et al.

(10) Patent No.: US 7,653,142 B2
(45) Date of Patent: *Jan. 26, 2010

(54) CHANNEL ESTIMATION AND SPATIAL PROCESSING FOR TDD MIMO SYSTEMS

(75) Inventors: John W. Ketchum, Harvard, MA (US); Mark S. Wallace, Bedford, MA (US); Jay Rodney Walton, Carlisle, MA (US); Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 11/610,351

(22) Filed: Dec. 13, 2006

(65) Prior Publication Data

US 2007/0086536 A1 Apr. 19, 2007

Related U.S. Application Data

(63) Continuation of application No. 10/693,171, filed on Oct. 23, 2003, now Pat. No. 7,151,809.

(51) Int. Cl.
*H04L 1/02* (2006.01)
*H04L 27/00* (2006.01)

(52) U.S. Cl. .................... 375/267; 375/299; 375/347

(58) Field of Classification Search ......... 375/259–260, 375/267, 285, 299, 329, 347, 343, 349; 370/329, 370/77, 314, 319, 321, 326, 336, 349, 380, 370/389, 394; 455/513, 67.11, 33.3, 103, 455/303, 500

See application file for complete search history.

(56) References Cited

U.S. PATENT DOCUMENTS 6,178,196 B1 1/2001 Naguib et al.

(Continued)

FOREIGN PATENT DOCUMENTS

EP 087545 3/2001

(Continued)

OTHER PUBLICATIONS

Hayashi, K, A New Spatio-Temporal Equalization Method Based On Estimated Channel Response, Sept. 2001, IEEE Transaction on Vehicular Technology, vol. 50, Issue 5, pp. 1250-1259.*

(Continued)

*Primary Examiner*—Tesfaldet Bocure
*Assistant Examiner*—Lawrence B Williams
(74) *Attorney, Agent, or Firm*—Dmitry Milikovsky; Ross L. Franks

(57) ABSTRACT

Channel estimation and spatial processing for a TDD MIMO system. Calibration may be performed to account for differences in the responses of transmit/receive chains at the access point and user terminal. During normal operation, a MIMO pilot is transmitted on a first link and used to derive an estimate of the first link channel response, which is decomposed to obtain a diagonal matrix of singular values and a first unitary matrix containing both left eigenvectors of the first link and right eigenvectors of a second link. A steered reference is transmitted on the second link using the eigenvectors in the first unitary matrix, and is processed to obtain the diagonal matrix and a second unitary matrix containing both left eigenvectors of the second link and right eigenvectors of the first link. Each unitary matrix may be used to perform spatial processing for data transmission/reception via both links.

40 Claims, 6 Drawing Sheets

U.S. PATENT DOCUMENTS

| | | | |
|---|---|---|---|
| 6,452,981 | B1 | 9/2002 | Polllack et al. |
| 6,532,562 | B1 | 3/2003 | Chou et al. |
| 6,594,798 | B1 | 7/2003 | Chou et al. |
| 6,668,161 | B2 | 12/2003 | Boros et al. |
| 6,738,020 | B1 | 5/2004 | Lindskog et al. |
| 6,771,706 | B2 | 8/2004 | Ling et al. |
| 6,873,651 | B2 | 3/2005 | Tesfai et al. |
| 6,888,899 | B2 | 5/2005 | Raleigh et al. |
| 6,940,917 | B2 * | 9/2005 | Menon et al. ............... 375/267 |
| 6,963,742 | B2 | 11/2005 | Boros et al. |
| 6,985,434 | B2 * | 1/2006 | Wu et al. .................... 370/208 |
| 7,062,294 | B1 * | 6/2006 | Rogard et al. ............ 455/562.1 |
| 7,110,463 | B2 | 9/2006 | Wallace et al. |
| 7,113,499 | B2 * | 9/2006 | Nafie et al. ................. 370/349 |
| 7,149,254 | B2 | 12/2006 | Sampath |
| 7,151,809 | B2 * | 12/2006 | Ketchum et al. ............ 375/347 |
| 7,248,638 | B1 * | 7/2007 | Banister .................... 375/267 |
| 7,248,841 | B2 * | 7/2007 | Agee et al. ................. 455/101 |
| 7,280,625 | B2 | 10/2007 | Ketchum et al. |
| 7,289,570 | B2 | 10/2007 | Schmidl et al. |
| 7,298,778 | B2 * | 11/2007 | Visoz et al. ................. 375/148 |
| 7,298,805 | B2 | 11/2007 | Walton et al. |
| 2002/0154705 | A1 | 10/2002 | Walton et al. |
| 2002/0196842 | A1 * | 12/2002 | Onggosanusi et al. ....... 375/148 |
| 2003/0125040 | A1 | 7/2003 | Walton et al. |
| 2003/0165187 | A1 * | 9/2003 | Tesfai et al. ................. 375/219 |
| 2004/0082356 | A1 | 4/2004 | Walton et al. |
| 2004/0165684 | A1 * | 8/2004 | Ketchum et al. ............ 375/343 |
| 2004/0179627 | A1 | 9/2004 | Ketchum et al. |
| 2006/0002496 | A1 * | 1/2006 | Wallace et al. .............. 375/347 |
| 2007/0177681 | A1 * | 8/2007 | Choi et al. .................. 375/260 |

FOREIGN PATENT DOCUMENTS

| | | |
|---|---|---|
| WO | 0176110 | 10/2001 |
| WO | 02078211 | 10/2002 |

OTHER PUBLICATIONS

International Search Report, ISR/PCT/US03/034567—International Search Authority—European Patent Office—Apr. 27, 2004.

International Preliminary Examination Report, PCT/US03/034567, International Preliminary Examining Authority, United States, Apr. 17, 2006.

* cited by examiner

CHANNEL ESTIMATION AND SPATIAL PROCESSING FOR TDD MIMO SYSTEMS

CLAIM OF PRIORITY UNDER 35 U.S.C. §120

The present Application for Patent is a continuation of patent application Ser. No. 10/693,171 entitled "CHANNEL ESTIMATION AND SPATIAL PROCESSING FOR TDD MIMO SYSTEMS" filed Oct. 23, 2003, allowed, and assigned to the assignee hereof and hereby expressly incorporated by reference herein.

BACKGROUND

1. Field

The present invention relates generally to data communication, and more specifically to techniques to perform channel estimation and spatial processing in time-division duplexed (TDD) multiple-input multiple-output (MIMO) communication systems.

2. Background

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel or an eigenmode of the MIMO channel and corresponds to a dimension. The MIMO system can provide improved performance (e.g., increased transmission capacity) if the additional dimensionalities created by the multiple transmit and receive antennas are utilized.

In order to transmit data on one or more of the $N_S$ eigenmodes of the MIMO channel, it is necessary to perform spatial processing at the receiver and typically also at the transmitter. The data streams transmitted from the $N_T$ transmit antennas interfere with each other at the receive antennas. The spatial processing attempts to separate out the data streams at the receiver so that they can be individually recovered.

To perform spatial processing, an accurate estimate of the channel response between the transmitter and receiver is typically required. For a TDD system, the downlink (i.e., forward link) and uplink (i.e., reverse link) between an access point and a user terminal both share the same frequency band. In this case, the downlink and uplink channel responses may be assumed to be reciprocal of one another, after calibration has been performed (as described below) to account for differences in the transmit and receive chains at the access point and user terminal. That is, if H represents the channel response matrix from antenna array A to antenna array B, then a reciprocal channel implies that the coupling from array B to array A is given by $H^T$, where $M^T$ denotes the transpose of M.

The channel estimation and spatial processing for a MIMO system typically consume a large portion of the system resources. There is therefore a need in the art for techniques to efficiently perform channel estimation and spatial processing in a TDD MIMO system.

SUMMARY

Techniques are provided herein to perform channel estimation and spatial processing in an efficient manner in a TDD MIMO system. For the TDD MIMO system, the reciprocal channel characteristics can be exploited to simplify the channel estimation and spatial processing at both the transmitter and receiver. Initially, an access point and a user terminal in the system may perform calibration to determine differences in the responses of their transmit and receive chains and to obtain correction factors used to account for the differences. Calibration may be performed to ensure that the "calibrated" channel, with the correction factors applied, is reciprocal. In this way, a more accurate estimate of a second link may be obtained based on an estimate derived for a first link.

During normal operation, a MIMO pilot is transmitted (e.g., by the access point) on the first link (e.g., the downlink) and used to derive an estimate of the channel response for the first link. The channel response estimate may then be decomposed (e.g., by the user terminal, using singular value decomposition) to obtain a diagonal matrix of singular values and a first unitary matrix containing both the left eigenvectors of the first link and the right eigenvectors of the second link (e.g., the uplink). The first unitary matrix may thus be used to perform spatial processing for data transmission received on the first link as well as for data transmission to be sent on the second link.

A steered reference may be transmitted on the second link using the eigenvectors in the first unitary matrix. A steered reference (or steered pilot) is a pilot transmitted on specific eigenmodes using the eigenvectors used for data transmission. This steered reference may then be processed (e.g., by the access point) to obtain the diagonal matrix and a second unitary matrix containing both the left eigenvectors of the second link and the right eigenvectors of the first link. The second unitary matrix may thus be used to perform spatial processing for data transmission received on the second link as well as for data transmission to be sent on the first link.

Various aspects and embodiments of the invention are described in further detail below.

BRIEF DESCRIPTION OF THE DRAWINGS

The various aspects and features of the present invention are described below in conjunction with the following drawings, in which.

DETAILED DESCRIPTION

Figure 1:
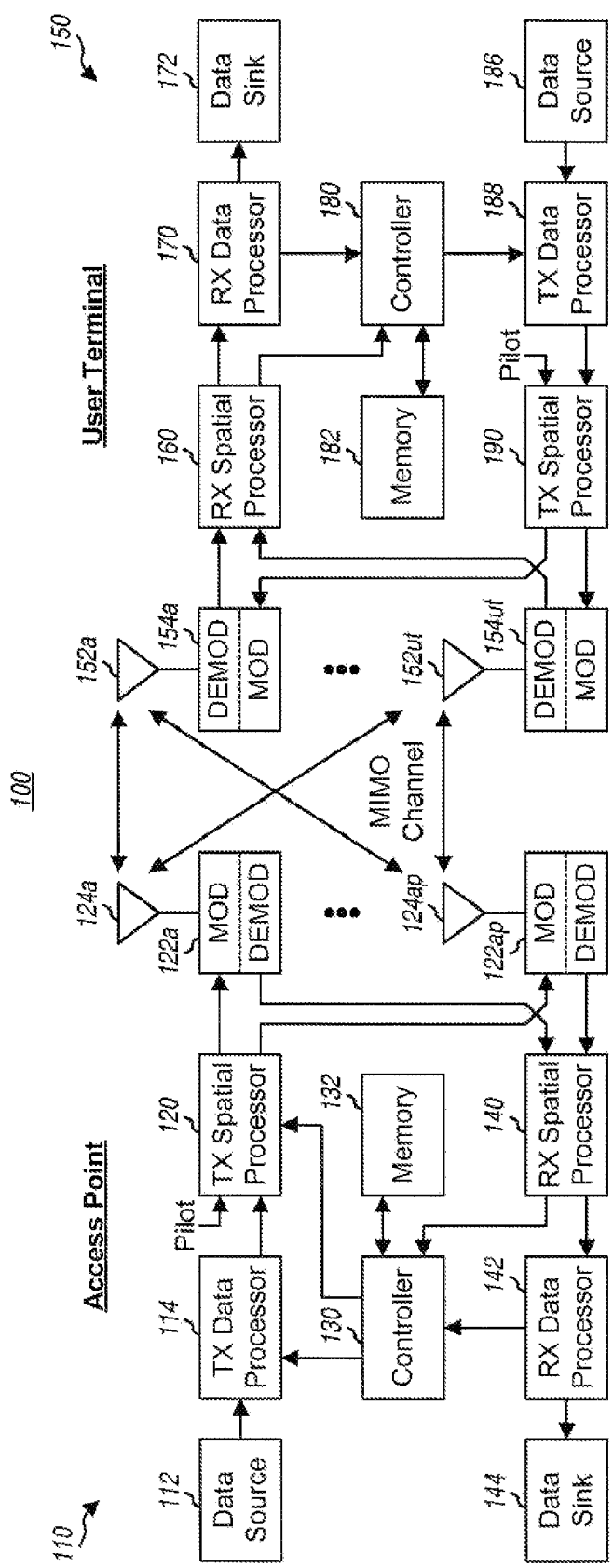
FIG. 1 is a block diagram of an access point and a user terminal in a TDD MIMO system, in accordance with one embodiment of the invention.

FIG. 1 is a block diagram of an embodiment of an access point 110 and a user terminal 150 in a TDD MIMO system 100. Access point 110 is equipped with $N_{ap}$ transmit/receive antennas for data transmission/reception, and user terminal 150 is equipped with $N_{ut}$ transmit/receive antennas.

On the downlink, at access point 110, a transmit (TX) data processor 114 receives traffic data (i.e., information bits)

from a data source 112 and signaling and other data from a controller 130. TX data processor 114 formats, codes, interleaves, and modulates (i.e., symbol maps) the data to provide modulation symbols. A TX spatial processor 120 receives the modulation symbols from TX data processor 114 and performs spatial processing to provide $N_{ap}$ streams of transmit symbols, one stream for each antenna. TX spatial processor 120 also multiplexes in pilot symbols as appropriate (e.g., for calibration and normal operation).

Each modulator (MOD) 122 (which includes a transmit chain) receives and processes a respective transmit symbol stream to provide a corresponding downlink modulated signal. The $N_{ap}$ downlink modulated signals from modulators 122a through 122ap are then transmitted from $N_{ap}$ antennas 124a through 124ap, respectively.

At user terminal 150, $N_{ut}$ antennas 152a through 152ut receive the transmitted downlink modulated signals, and each antenna provides a received signal to a respective demodulator (DEMOD) 154. Each demodulator 154 (which includes a receive chain) performs processing complementary to that performed at modulator 122 and provides received symbols. A receive (RX) spatial processor 160 then performs spatial processing on the received symbols from all demodulators 154a through 154ut to provide recovered symbols, which are estimates of the modulation symbols sent by the access point. An RX data processor 170 further processes (e.g., symbol demaps, deinterleaves, and decodes) the recovered symbols to provide decoded data. The decoded data may include recovered traffic data, signaling, and so on, which may be provided to a data sink 172 for storage and/or a controller 180 for further processing.

The processing for the uplink may be the same or different from the processing for the downlink. Data and signaling are processed (e.g., coded, interleaved, and modulated) by a TX data processor 188 and further spatially processed by a TX spatial processor 190, which also multiplexes in pilot symbols as appropriate (e.g., for calibration and normal operation). The pilot and transmit symbols from TX spatial processor 190 are further processed by modulators 154a through 154ut to generate $N_{ut}$ uplink modulated signals, which are then transmitted via antennas 152a through 152ut to the access point.

At access point 110, the uplink modulated signals are received by antennas 124a through 124ap, demodulated by demodulators 122a through 122ap, and processed by an RX spatial processor 140 and an RX data processor 142 in a complementary manner to that performed at the user terminal. The decoded data for the uplink may be provided to a data sink 144 for storage and/or controller 130 for further processing.

Controllers 130 and 180 control the operation of various processing units at the access point and user terminal, respectively. Memory units 132 and 182 store data and program codes used by controllers 130 and 180, respectively.

1. Calibration

For a TDD system, since the downlink and uplink share the same frequency band, a high degree of correlation normally exists between the downlink and uplink channel responses. Thus, the downlink and uplink channel response matrices may be assumed to be reciprocal (i.e., transpose) of each other. However, the responses of the transmit/receive chains at the access point are typically not equal to the responses of the transmit/receive chains at the user terminal. For improved performance, the differences may be determined and accounted for via calibration.

Figure 2A:
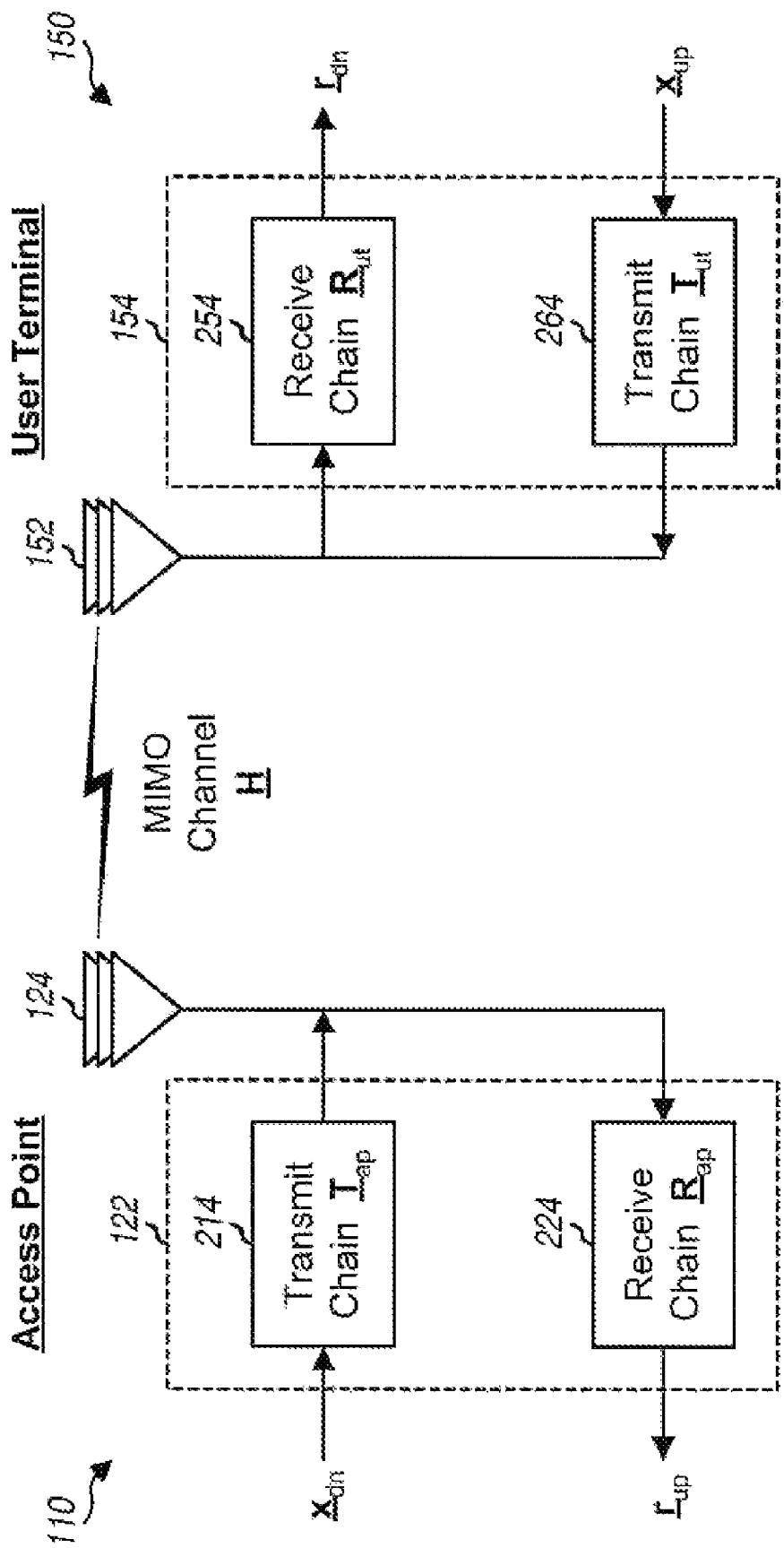
FIG. 2A shows a block diagram of the transmit and receive chains at the access point and user terminal, in accordance with one embodiment of the invention.

FIG. 2A shows a block diagram of the transmit and receive chains at access point 110 and user terminal 150, in accordance with one embodiment of the invention. For the downlink, at access point 110, symbols (denoted by a "transmit" vector $x_{dn}$) are processed by a transmit chain 214 and transmitted from $N_{ap}$ antennas 124 over the MIMO channel. At user terminal 150, the downlink signals are received by $N_{ut}$ antennas 152 and processed by a receive chain 254 to provide received symbols (denoted by a "receive" vector $r_{dn}$). For the uplink, at user terminal 150, symbols (denoted by a transmit vector $x_{up}$) are processed by a transmit chain 264 and transmitted from $N_{ut}$ antennas 152 over the MIMO channel. At access point 110, the uplink signals are received by $N_{ap}$ antennas 124 and processed by a receive chain 224 to provide received symbols (denoted by a receive vector $r_{up}$).

For the downlink, the receive vector $r_{dn}$ at the user terminal (in the absence of noise) may be expressed as:

$$r_{dn} = R_{ut} H T_{ap} x_{dn}, \qquad \text{Eq (1)}$$

where $x_{dn}$ is the transmit vector with $N_{ap}$ entries for the downlink;

$r_{dn}$ is the receive vector with $N_{ut}$ entries;

$T_{ap}$ is an $N_{ap} \times N_{ap}$ diagonal matrix with entries for the complex gains associated with the transmit chain for the $N_{ap}$ antennas at the access point;

$R_{ut}$ is an $N_{ut} \times N_{ut}$ diagonal matrix with entries for the complex gains associated with the receive chain for the $N_{ut}$ antennas at the user terminal; and H is an $N_{ut} \times N_{ap}$ channel response matrix for the downlink.

The responses of the transmit/receive chains and the MIMO channel are typically a function of frequency. For simplicity, a flat-fading channel (i.e., with a flat frequency response) is assumed for the following derivation.

For the uplink, the receive vector $r_{up}$ at the access point (in the absence of noise) may be expressed as:

$$r_{up} = R_{ap} H^T T_{ut} x_{up}, \qquad \text{Eq (2)}$$

where $x_{up}$ is the transmit vector with $N_{ut}$ entries for the uplink;

$r_{up}$ is the receive vector with $N_{ap}$ entries;

$T_{ut}$ is an $N_{ut} \times N_{ut}$ diagonal matrix with entries for the complex gains associated with the transmit chain for the $N_{ut}$ antennas at the user terminal;

$R_{ap}$ is an $N_{ap} \times N_{ap}$ diagonal matrix with entries for the complex gains associated with the receive chain for the $N_{ap}$ antennas at the access point; and $H^T$ is an $N_{ap} \times N_{ut}$ channel response matrix for the uplink.

From equations (1) and (2), the "effective" downlink and uplink channel responses, $H_{dn}$ and $H_{up}$, which include the responses of the applicable transmit and receive chains, may be expressed as:

$$H_{dn} = R_{ut} H T_{ap} \text{ and } H_{up} = R_{ap} H^T T_{ut}. \qquad \text{Eq (3)}$$

As shown in equation (3), if the responses of the transmit/receive chains at the access point are not equal to the responses of the transmit/receive chains at the user terminal, then the effective downlink and uplink channel responses are not reciprocal of one another, i.e., $R_{ut} H T_{ap} \neq (R_{ap} H^T T_{ut})^T$.

Combining the two equations in equation set (3), the following relationship may be obtained:

$$H = R_{ut}^{-1} H_{dn} T_{ap}^{-1} = (R_{ap}^{-1} H_{up} T_{ut}^{-1})^T = T_{ut}^{-1} H_{up}^T R_{ap}^{-1}. \qquad \text{Eq (4)}$$

Rearranging equation (4), the following is obtained:

$$H_{up}^T = T_{ut} R_{ut}^{-1} H_{dn} T_{ap}^{-1} R_{ap} = K_{ut}^{-1} H_{dn} K_{ap}$$

or $$H_{up} = (K_{ut}^{-1} H_{dn} K_{ap})^T, \qquad \text{Eq (5)}$$

where $K_{ut} = T_{ut}^{-1} R_{ut}$ and $K_{ap} = T_{ap}^{-1} R_{ap}$. Because $T_{ut}$, $R_{ut}$, $T_{ap}$, and $R_{ap}$ are diagonal matrices, $K_{ap}$ and $K_{ut}$ are also diagonal matrices. Equation (5) may also be expressed as:

$$H_{up} K_{ut} = (H_{dn} K_{ap})^T. \quad \text{Eq (6)}$$

The matrices $K_{ap}$ and $K_{ut}$ may be viewed as including "correction factors" that can account for differences in the transmit/receive chains at the access point and user terminal. This would then allow the channel response for one link to be expressed by the channel response for the other link, as shown in equation (5).

Calibration may be performed to determine the matrices $K_{ap}$ and $K_{ut}$. Typically, the true channel response H and the transmit/receive chain responses are not known nor can they be exactly or easily ascertained. Instead, the effective downlink and uplink channel responses, $H_{dn}$ and $H_{up}$, may be estimated based on MIMO pilots sent on the downlink and uplink, respectively. The generation and use of MIMO pilot are described in detail in the aforementioned U.S. Patent Application Ser. No. 60/421,309.

Estimates of the matrices $K_{ap}$ and $K_{ut}$, which are referred to as correction matrices, $\hat{K}_{ap}$ and $\hat{K}_{ut}$, may be derived based on the downlink and uplink channel response estimates, $\hat{H}_{dn}$ and $\hat{H}_{up}$, in various manners, including by a matrix-ratio computation and a minimum mean square error (MMSE) computation. For the matrix-ratio computation, an $(N_{ut} \times N_{ap})$ matrix C is first computed as a ratio of the uplink and downlink channel response estimates, as follows:

$$\underline{C} = \frac{\hat{H}_{up}^T}{\hat{H}_{dn}}, \quad \text{Eq (7)}$$

where the ratio is taken element-by-element. Each element of C may thus be computed as:

$$c_{i,j} = \frac{\hat{h}_{up\,i,j}}{\hat{h}_{dn\,i,j}},$$

for $$i = \{1 \ldots N_{ut}\}$$

and $$j = \{1 \ldots N_{ap}\},$$

where $\hat{h}_{up\,i,j}$ and $\hat{h}_{dn\,i,j}$ are the (i,j)-th (row, column) element of $\hat{H}_{up}^T$ and $\hat{H}_{dn}$, respectively, and $C_{i,j}$ is the (i,j)-th element of C.

A correction vector for the access point, $\hat{k}_{ap}$, which includes only the $N_{ap}$ diagonal elements of $\hat{K}_{ap}$, may be defined to be equal to the mean of the normalized rows of C. Each row of C, $c_i$, is first normalized by dividing each element of the row with the first element of the row to obtain a corresponding normalized row, $\tilde{c}_i$. Thus, if $c_i(k) = [c_{i,1} \ldots c_{i,N_{ap}}]$ is the i-th row of C, then the normalized row $\tilde{c}_i$ may be expressed as:

$$\tilde{c}_i(k) = [c_{i,1}(k)/c_{i,1}(k) \ldots c_{i,j}(k)/c_{i,1}(k) \ldots c_{i,N_{ap}}(k)/c_{i,1}(k)].$$

The correction vector $\hat{k}_{ap}(k)$ is then set equal to the mean of the $N_{ut}$ normalized rows of C and may be expressed as:

$$\hat{k}_{ap} = \frac{1}{N_{ut}} \sum_{i=1}^{N_{ut}} \tilde{c}_i. \quad \text{Eq (8)}$$

Because of the normalization, the first element of $\hat{k}_{ap}(k)$ is unity.

A correction vector $\hat{k}_{ut}(k)$ for the user terminal, $\hat{k}_{ut}(k)$, which includes only the $N_{ut}$ diagonal elements of $\hat{K}_{ut}(k)$, may be defined to be equal to the mean of the inverses of the normalized columns of C. Each column of C, $c_j$, is first normalized by scaling each element in the column with the j-th element of the vector $\hat{k}_{ap}$, which is denoted as $K_{ap,j,j}$, to obtain a corresponding normalized column, $\check{c}_j$. Thus, if $c_j(k) = [c_{1,j} \ldots c_{N_{ut},j}]^T$ is the j-th column of C, then the normalized column $\check{c}_j$ may be expressed as:

$$\check{c}_j = [c_{1,j}/K_{ap,j,j} \ldots c_{i,j}/K_{ap,j,j} \ldots c_{N_{ut},j}/K_{ap,j,j}]^T.$$

The correction vector $\hat{k}_{ap}$ is then set equal to the mean of the inverses of the $N_{ap}$ normalized columns of C and may be expressed as:

$$\hat{k}_{ut} = \frac{1}{N_{ap}} \sum_{j=1}^{N_{ap}} \frac{1}{\check{c}_j}, \quad \text{Eq (9)}$$

where the inversion of the normalized columns, $\check{c}_j(k)$, is performed element-wise. The calibration provides the correction vectors, $\hat{k}_{ap}$ and $\hat{k}_{ut}$, or the corresponding correction matrices $\hat{K}_{ap}$ and $\hat{K}_{ut}$, for the access point and user terminal, respectively.

The MMSE computation for the correction matrices $\hat{K}_{ap}$ and $\hat{K}_{ut}$ is described in detail in U.S. Patent Application Ser. No. 60/421,462.

Figure 2B:
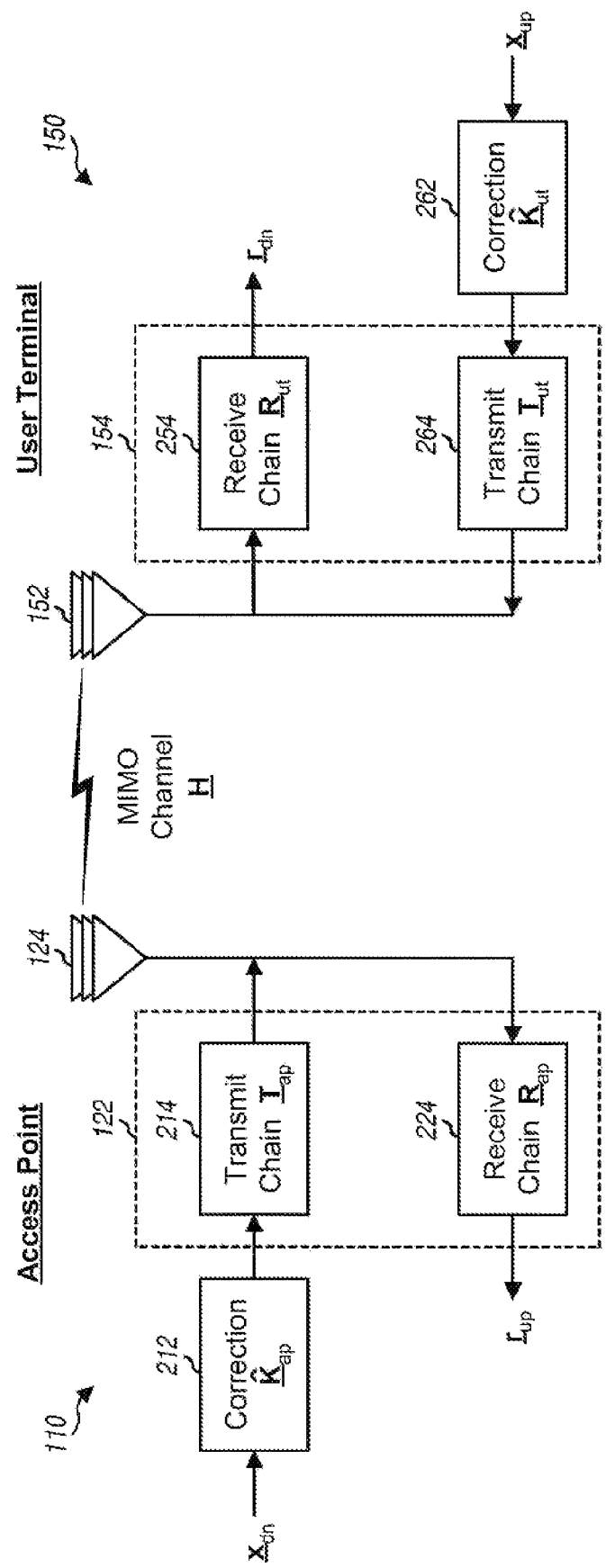
FIG. 2B shows application of correction matrices to account for differences in the transmit/receive chains at the access point and user terminal, in accordance with one embodiment of the invention.

FIG. 2B illustrates the application of the correction matrices to account for differences in the transmit/receive chains at the access point and user terminal, in accordance with one embodiment of the invention. On the downlink, the transmit vector $x_{dn}$ is first multiplied with the matrix $\hat{K}_{ap}$ by a unit 212. The subsequent processing by transmit chain 214 and receive chain 254 for the downlink is the same as shown in FIG. 2A. Similarly, on the uplink, the transmit vector $x_{up}$ is first multiplied with the matrix $\hat{K}_{ut}$ by a unit 262. Again, the subsequent processing by transmit chain 264 and receive chain 224 for the uplink is the same as shown in FIG. 2A.

The "calibrated" downlink and uplink channel responses observed by the user terminal and access point, respectively, may be expressed as:

$$H_{cdn} = H_{dn} \hat{K}_{ap} \text{ and } H_{cup} = H_{up} \hat{K}_{ut}, \quad \text{Eq(10)}$$

where $H_{cdn}^T$ and $H_{cup}$ are estimates of the "true" calibrated channel response expressions in equation (6). From equations (6) and (10), it can be seen that $H_{cup} \approx H_{cdn}^T$. The accuracy of the relationship $H_{cup} \approx H_{cdn}^T$ is dependent on the accuracy of the estimates $\hat{K}_{ap}$ and $\hat{K}_{ut}$, which in turn is dependent on the quality of the downlink and uplink channel response estimates, $\hat{H}_{dn}$ and $\hat{H}_{up}$. As shown above, once the transmit/receive chains have been calibrated, a calibrated channel response estimate obtained for one link (e.g., $\hat{H}_{cdn}$) may be used as an estimate of the calibrated channel response for the other link (e.g., $\hat{H}_{cup}$).

The calibration for TDD MIMO systems is described in detail in U.S. Patent Application Ser. No. 60/421,309 and U.S. Patent Application Ser. No. 60/421,462.

2. Spatial Processing

For a MIMO system, data may be transmitted on one or more eigenmodes of the MIMO channel. A spatial multiplexing mode may be defined to cover data transmission on multiple eigenmodes, and a beam-steering mode may be defined to cover data transmission on a single eigenmode. Both operating modes require spatial processing at the transmitter and receiver.

The channel estimation and spatial processing techniques described herein may be used for MIMO systems with and without OFDM. OFDM effectively partitions the overall system bandwidth into a number of ($N_F$) orthogonal subbands, which are also referred to as frequency bins or subchannels. With OFDM, each subband is associated with a respective subcarrier upon which data may be modulated. For a MIMO system that utilizes OFDM (i.e., a MIMO-OFDM system), each eigenmode of each subband may be viewed as an independent transmission channel. For clarity, the channel estimation and spatial processing techniques are described below for a TDD MIMO-OFDM system. For this system, each subband of the wireless channel may be assumed to be reciprocal.

The correlation between the downlink and uplink channel responses may be exploited to simplify the channel estimation and spatial processing at the access point and user terminal for a TDD system. This simplification is effective after calibration has been performed to account for differences in the transmit/receive chains. The calibrated channel responses may be expressed as a function of frequency, as follows:

$$H_{cdn}(k) = H_{dn}(k)\hat{K}_{ap}(k), \text{ for } k \in K, \text{ and}$$

$$H_{cup}(k) = H_{up}(k)\hat{K}_{ut}(k) \approx (H_{dn}(k)\hat{K}_{ap}(k))^T, \text{ for } k \in K, \qquad \text{Eq (11)}$$

where K represents a set of all subbands that may be used for data transmission (i.e., the "data subbands"). The calibration may be performed such that the matrices $\hat{K}_{ap}(k)$ and $\hat{K}_{ut}(k)$ are obtained for each of the data subbands.

Alternatively, the calibration may be performed for only a subset of all data subbands, in which case the matrices $\hat{K}_{ap}(k)$ and $\hat{K}_{ut}(k)$ for the "uncalibrated" subbands may be obtained by interpolating the matrices for the "calibrated" subbands, as described in U.S. Patent Application Ser. No. 60/421,462.

The channel response matrix H(k) for each subband may be "diagonalized" to obtain the $N_S$ eigenmodes for that subband. This may be achieved by performing either singular value decomposition on the channel response matrix H(k) or eigenvalue decomposition on the correlation matrix of H(k), which is R(k)=$H^H$(k)H(k). For clarity, singular value decomposition is used for the following description.

The singular value decomposition of the calibrated uplink channel response matrix, $H_{cup}(k)$, may be expressed as:

$$H_{cup}(k) = U_{ap}(k)\Sigma(k)V_{ut}^H(k), \text{ for } k \in K, \qquad \text{Eq (12)}$$

where $U_{ap}(k)$ is an ($N_{ap} \times N_{ap}$) unitary matrix of left eigenvectors of $H_{cup}(k)$;

$\Sigma(k)$ is an ($N_{ap} \times N_{ut}$) diagonal matrix of singular values of $H_{cup}(k)$; and $V_{ut}(k)$ is an ($N_{ut} \times N_{ut}$) unitary matrix of right eigenvectors of $H_{cup}(k)$.

A unitary matrix is characterized by the property $M^H M = I$, where I is the identity matrix.

Correspondingly, the singular value decomposition of the calibrated downlink channel response matrix, $H_{cdn}(k)$, may be expressed as:

$$H_{cdn}(k) = V_{ut}^*(k)\Sigma(k)U_{ap}^T(k), \text{ for } k \in K, \qquad \text{Eq (13)}$$

where the matrices $V_{ut}^*(k)$ and $U_{ap}^*(k)$ are unitary matrices of left and right eigenvectors, respectively, of $H_{cdn}(k)$. As shown in equations (12) and (13) and based on the above description, the matrices of left and right eigenvectors for one link are the complex conjugate of the matrices of right and left eigenvectors, respectively, for the other link. The matrices $V_{ut}(k), V_{ut}^*(k), V_{ut}^T(k)$, and $V_{ut}^H(k)$ are different forms of the matrix $V_{ut}(k)$, and the matrices $U_{ap}(k), U_{ap}^*(k), U_{ap}^T(k)$, and $U_{ap}^H(k)$ are also different forms of the matrix $U_{ap}(k)$. For simplicity, reference to the matrices $U_{ap}(k)$ and $V_{ut}(k)$ in the following description may also refer to their various other forms. The matrices $U_{ap}(k)$ and $V_{ut}(k)$ are used by the access point and user terminal, respectively, for spatial processing and are denoted as such by their subscripts. The eigenvectors are also often referred to as "steering" vectors.

Singular value decomposition is described in further detail by Gilbert Strang in a book entitled "Linear Algebra and Its Applications," Second Edition, Academic Press, 1980.

The user terminal can estimate the calibrated downlink channel response based on a MIMO pilot sent by the access point. The user terminal may then perform singular value decomposition for the calibrated downlink channel response estimate $\hat{H}_{cdn}(k)$, for $k \in K$, to obtain the diagonal matrix $\hat{\Sigma}(k)$ and the matrix $\hat{V}_{ut}^*(k)$ of left eigenvectors of $\hat{H}_{cdn}(k)$. This singular value decomposition may be given as $\hat{H}_{cdn}(k) = \hat{V}_{ut}^*(k)\hat{\Sigma}(k)\hat{U}_{ap}^T(k)$, where the hat ("^") above each matrix indicates that it is an estimate of the actual matrix.

Similarly, the access point can estimate the calibrated uplink channel response based on a MIMO pilot sent by the user terminal. The access point may then perform singular value decomposition for the calibrated uplink channel response estimate $\hat{H}_{cup}(k)$, for $k \in K$, to obtain the diagonal matrix $\hat{\Sigma}(k)$ and the matrix $\hat{U}_{ap}(k)$ of left eigenvectors of $\hat{H}_{cup}(k)$. This singular value decomposition may be given as $\hat{H}_{cup}(k) = \hat{U}_{ap}(k)\hat{\Sigma}(k)\hat{V}_{ut}^H(k)$.

However, because of the reciprocal channel and the calibration, the singular value decomposition only needs to be performed by either the user terminal or the access point. If performed by the user terminal, then the matrix $\hat{V}_{ut}(k)$, for $k \in K$, are used for spatial processing at the user terminal and the matrix $\hat{U}_{ap}(k)$, for $k \in K$, may be provided to the access point in either a direct form (i.e., by sending entries of the matrices $\hat{U}_{ap}(k)$ ) or an indirect form (e.g., via a steered reference, as described below).

The singular values in each matrix $\hat{\Sigma}(k)$, for $k \in K$, may be ordered such that the first column contains the largest singular value, the second column contains the next largest singular value, and so on (i.e., $\sigma_1 \geq \sigma_2 \geq \ldots \geq \sigma_{N_S}$, where $\sigma_i$ is the eigenvalue in the i-th column of $\hat{\Sigma}(k)$ after the ordering). When the singular values for each matrix $\hat{\Sigma}(k)$ are ordered, the eigenvectors (or columns) of the associated unitary matrices $\hat{V}_{ut}(k)$ and $\hat{U}_{ap}(k)$ for that subband are also ordered correspondingly. A "wideband" eigenmode may be defined as the set of same-order eigenmode of all subbands after the ordering (i.e., the m-th wideband eigenmode includes the m-th eigenmode of all subbands). Each wideband eigenmode is associated with a respective set of eigenvectors for all of the subbands. The principle wideband eigenmode is the one associated with the largest singular value in each matrix $\hat{\Sigma}(k)$ after the ordering.

A. Uplink Spatial Processing

The spatial processing by the user terminal for an uplink transmission may be expressed as:

$$x_{up}(k) = \hat{K}_{ut}(k)\hat{V}_{ut}(k)s_{up}(k), \text{ for } k \in K, \quad \text{Eq (14)}$$

where $x_{up}(k)$ is the transmit vector for the uplink for the k-th subband; and $s_{up}(k)$ is a "data" vector with up to $N_S$ non-zero entries for the modulation symbols to be transmitted on the $N_S$ eigenmodes of the k-th subband.

The received uplink transmission at the access point may be expressed as:

$$\begin{aligned} r_{up}(k) &= \underline{H}_{up}(k)\underline{x}_{up}(k) + \underline{n}_{up}(k), \text{ for } k \in K. \quad \text{Eq (15)} \\ &= \underline{H}_{up}(k)\hat{K}_{ut}(k)\hat{V}_{ut}(k)s_{up}(k) + \underline{n}_{up}(k) \\ &\approx \hat{H}_{cup}(k)\hat{V}_{ut}(k)s_{up}(k) + n_{up}(k) \\ &= \underline{\hat{U}}_{ap}(k)\hat{\Sigma}(k)\hat{V}_{ut}^H(k)\hat{V}_{ut}(k)s_{up}(k) + \underline{n}_{up}(k) \\ &= \underline{\hat{U}}_{ap}(k)\hat{\Sigma}(k)s_{up}(k) + \underline{n}_{up}(k) \end{aligned}$$

where $r_{up}(k)$ is the received vector for the uplink for the k-th subband; and $n_{up}(k)$ is additive white Gaussian noise (AWGN) for the k-th subband.

Equation (15) uses the following relationships: $H_{up}(k)$ $\hat{K}_{up}(k) = H_{cup}(k) \approx \hat{H}_{cup}(k)$ and $\hat{H}_{cup}(k) = \hat{U}_{ap}(k)\hat{\Sigma}(k)\hat{V}_{ut}^H(k)$.

A weighted matched filter matrix $M_{ap}(k)$ for the uplink transmission from the user terminal may be expressed as:

$$M_{ap}(k) = \hat{\Sigma}^{-1}(k)\hat{U}_{ap}^H(k), \text{ for } k \in K. \quad \text{Eq (16)}$$

The spatial processing (or matched filtering) at the access point for the received uplink transmission may be expressed as:

$$\begin{aligned} \hat{s}_{up}(k) &= \hat{\Sigma}^{-1}(k)\underline{\hat{U}}_{ap}^H(k)\underline{r}_{up}(k) \quad \text{Eq (17)} \\ &= \hat{\Sigma}^{-1}(k)\underline{\hat{U}}_{ap}^H(k)(\underline{\hat{U}}_{ap}(k)\hat{\Sigma}(k)s_{up}(k) + \underline{n}_{up}(k)), \text{ for } k \in K, \\ &= s_{up}(k) + \tilde{n}_{up}(k) \end{aligned}$$

where $\hat{s}_{up}(k)$ is an estimate of the data vector $s_{up}(k)$ transmitted by the user terminal on the uplink, and $\tilde{n}_{up}(k)$ is the post-processed noise.

B. Downlink Spatial Processing

The spatial processing by the access point for a downlink transmission may be expressed as:

$$x_{dn}(k) = \hat{K}_{ap}(k)\hat{U}_{ap}^*(k)s_{dn}(k), \text{ for } k \in K, \quad \text{Eq (18)}$$

where $x_{dn}(k)$ is the transmit vector and $s_{dn}(k)$ is the data vector for the downlink.

The received downlink transmission at the user terminal may be expressed as:

$$\begin{aligned} r_{dn}(k) &= \underline{H}_{dn}(k)\underline{x}_{dn}(k) + \underline{n}_{dn}(k) \quad \text{Eq (19)} \\ &= \underline{H}_{dn}(k)\hat{K}_{ap}(k)\hat{U}_{ap}^*(k)s_{dn}(k) + \underline{n}_{dn}(k) \\ &\approx \hat{H}_{cdn}(k)\hat{U}_{ap}^*(k)s_{dn}(k) + \underline{n}_{dn}(k) \end{aligned}$$

$$\begin{aligned} &= \hat{\underline{V}}_{ut}^*(k)\hat{\Sigma}(k)\hat{U}_{ap}^T(k)\hat{U}_{ap}^*(k)s_{dn}(k) + \underline{n}_{dn}(k)) \\ &= \hat{\underline{V}}_{ut}^*(k)\hat{\Sigma}(k)s_{dn}(k) + \underline{n}_{dn}(k), \text{ for } k \in K. \end{aligned}$$

A weighted matched filter matrix $M_{ut}(k)$ for the downlink transmission from the access point may be expressed as:

$$M_{ut}(k) = \hat{\Sigma}^{-1}(k)\hat{V}_{ut}^T(k), \text{ for } k \in K. \quad \text{Eq (20)}$$

The spatial processing (or matched filtering) at the user terminal for the received downlink transmission may be expressed as:

$$\begin{aligned} \hat{s}_{dn}(k) &= \hat{\Sigma}^{-1}(k)\hat{V}_{ut}^T(k)r_{dn}(k) \quad \text{Eq (21)} \\ &= \hat{\Sigma}^{-1}(k)\hat{V}_{ut}^T(k)(\hat{V}_{ut}^*(k)\hat{\Sigma}(k)s_{dn}(k) + \underline{n}_{dn}(k)), \text{ for } k \in K. \\ &= s_{dn}(k) + \tilde{n}_{dn}(k) \end{aligned}$$

Table 1 summarizes the spatial processing at the access point and user terminal for data transmission and reception.

TABLE 1

| | Uplink | Downlink |
|---|---|---|
| User Terminal | Transmit: $x_{up}(k) = \hat{K}_{ut}(k)\hat{V}_{ut}(k)s_{up}(k)$ | Receive: $\hat{s}_{dn}(k) = \hat{\Sigma}^{-1}(k)\hat{V}_{ut}^T(k)r_{dn}(k)$ |
| Access Point | Receive: $\hat{s}_{up}(k) = \hat{\Sigma}^{-1}(k)\hat{U}_{ap}^H(k)r_{up}(k)$ | Transmit: $x_{dn}(k) = \hat{K}_{ap}(k)\hat{U}_{ap}^*(k)s_{dn}(k)$ |

In the above description and as shown in Table 1, the correction matrices $\hat{K}_{ap}(k)$ and $\hat{K}_{ut}(k)$ are applied on the transmit side at the access point and user terminal, respectively. The correction matrices $\hat{K}_{ap}(k)$ and $\hat{K}_{ut}(k)$ may also be combined with other diagonal matrices (e.g., such as weight matrices $W_{dn}(k)$ and $W_{up}(k)$ used to achieve channel inversion). However, the correction matrices may also be applied on the receive side, instead of the transmit side, and this is within the scope of the invention.

Figure 3:
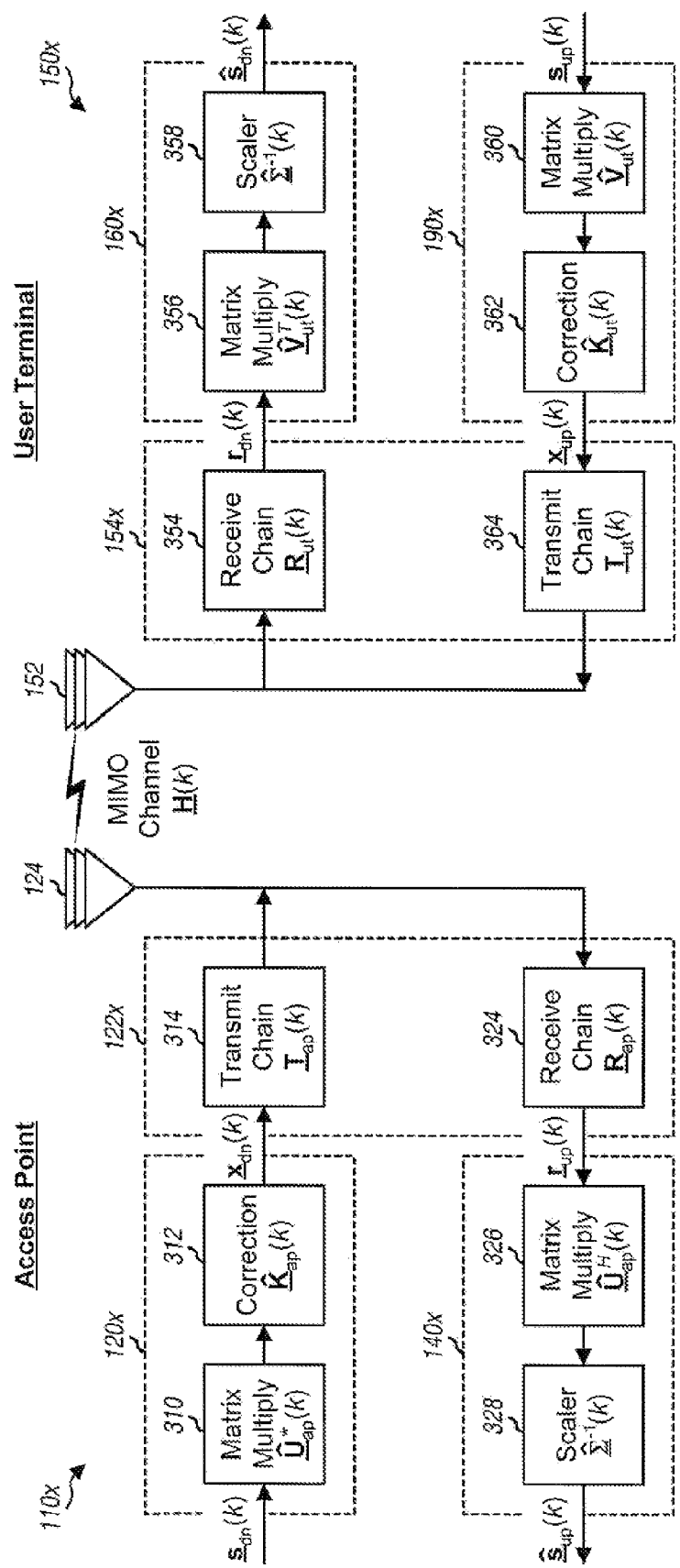
FIG. 3 shows the spatial processing for the downlink and uplink for a spatial multiplexing mode, in accordance with one embodiment of the invention.

FIG. 3 is a block diagram of the spatial processing for the downlink and uplink for the spatial multiplexing mode, in accordance with one embodiment of the invention.

For the downlink, within a TX spatial processor 120x at access point 110x, the data vector $s_{dn}(k)$, for $k \in K$, is first multiplied with the matrix $\hat{U}_{ap}^*(k)$ by a unit 310 and then further multiplied with the correction matrix $\hat{K}_{ap}(k)$ by a unit 312 to obtain the transmit vector $x_{dn}(k)$. The vector $x_{dn}(k)$, for $k \in K$, is then processed by a transmit chain 314 within modulator 122x and transmitted over the MIMO channel to user terminal 150x. Unit 310 performs the spatial processing for the downlink data transmission.

At user terminal 150x, the downlink signals are processed by a receive chain 354 within demodulator 154x to obtain the receive vector $r_{dn}(k)$, for $k \in K$. Within an RX spatial processor 160x, the receive vector $r_{dn}(k)$, for $k \in K$, is first multiplied with the matrix $\hat{V}_{ut}^T(k)$ by a unit 356 and further scaled by the inverse diagonal matrix $\hat{\Sigma}^{-1}(k)$ by a unit 358 to obtain the vector $\hat{s}_{dn}(k)$, which is an estimate of the data vector $s_{dn}(k)$. Units 356 and 358 perform the spatial processing for the downlink matched filtering.

For the uplink, within a TX spatial processor 190x at user terminal 150x, the data vector $s_{up}(k)$, for k∈K, is first multiplied with the matrix $\hat{V}_{ut}(k)$ by a unit 360 and then further multiplied with the correction matrix $\hat{K}_{ut}(k)$ by a unit 362 to obtain the transmit vector $x_{up}(k)$. The vector $x_{up}(k)$, for k∈K, is then processed by a transmit chain 364 within modulator 154x and transmitted over the MIMO channel to access point 110x. Unit 360 performs the spatial processing for the uplink data transmission.

At access point 110x, the uplink signals are processed by a receive chain 324 within demodulator 122x to obtain the receive vector $r_{up}(k)$, for k∈K. Within an RX spatial processor 140x, the receive vector $r_{up}(k)$, for k∈K, is first multiplied with the matrix $\hat{U}_{ap}^H(k)$ by a unit 326 and further scaled by the inverse diagonal matrix $\hat{\Sigma}^{-1}(k)$ by a unit 328 to obtain the vector $\hat{s}_{up}(k)$, which is an estimate of the data vector $s_{up}(k)$. Units 326 and 328 perform the spatial processing for the uplink matched filtering.

3. Beam-Steering

For certain channel conditions, it is better to transmit data on only one wideband eigenmode—typically the best or principal wideband eigenmode. This may be the case if the received signal-to-noise ratios (SNRs) for all other wideband eigenmodes are sufficiently poor so that improved performance is achieved by using all of the available transmit power on the principal wideband eigenmode.

Data transmission on one wideband eigenmode may be achieved using either beam-forming or beam-steering. For beam-forming, the modulation symbols are spatially processed with the eigenvectors $\hat{v}_{ut,1}(k)$ or $\hat{u}_{ap,1}(k)$, for k∈K, for the principal wideband eigenmode (i.e., the first column of $\hat{V}_{ut}(k)$ or $\hat{U}_{ap}(k)$, after the ordering). For beam-steering, the modulation symbols are spatially processed with a set of "normalized" (or "saturated") eigenvectors $\tilde{v}_{ut}(k)$ or $\tilde{u}_{ap}(k)$, for k∈K, for the principal wideband eigenmode. For clarity, beam-steering is described below for the uplink.

For the uplink, the elements of each eigenvector $\hat{v}_{ut,1}(k)$, for k∈K, for the principal wideband eigenmode may have different magnitudes. Thus, the preconditioned symbols for each subband, which are obtained by multiplying the modulation symbol for subband k with the elements of the eigenvector $\hat{v}_{ut,1}(k)$ for subband k, may then have different magnitudes. Consequently, the per-antenna transmit vectors, each of which includes the preconditioned symbols for all data subbands for a given transmit antenna, may have different magnitudes. If the transmit power for each transmit antenna is limited (e.g., because of limitations of power amplifiers), then beam-forming may not fully use the total power available for each antenna.

Beam-steering uses only the phase information from the eigenvectors $\hat{v}_{ut,1}(k)$, for k∈K, for the principal wideband eigenmode and normalizes each eigenvector such that all elements in the eigenvector have equal magnitudes. The normalized eigenvector $\tilde{v}_{ut}(k)$ for the k-th subband may be expressed as:

$$\tilde{v}_{ut}(k) = [Ae^{j\theta_1(k)} Ae^{j\theta_2(k)} \ldots Ae^{j\theta_{N_{ut}}(k)}]^T, \quad \text{Eq (22)}$$

where A is a constant (e.g., A =1); and $\theta_i(k)$ is the phase for the k-th subband of the i-th transmit antenna, which is given as:

$$\theta_i(k) = \angle \hat{v}_{ut,1,i}(k) = \tan^{-1}\left(\frac{\text{Im}\{\hat{v}_{ut,1,i}(k)\}}{\text{Re}\{\hat{v}_{ut,1,i}(k)\}}\right). \quad \text{Eq (23)}$$

As shown in equation (23), the phase of each element in the vector $\tilde{v}_{ut}(k)$ is obtained from the corresponding element of the eigenvector $\hat{v}_{ut,1}(k)$ (i.e., $\theta_i(k)$ is obtained from $\hat{v}_{ut,1,i}(k)$, where $\hat{v}_{ut,1}(k) = [\hat{v}_{ut,1,1}(k) \hat{v}_{ut,1,2}(k) \ldots \hat{v}_{ut,1,N_{ut}}(k)]^T$).

A. Uplink Beam-Steering

The spatial processing by the user terminal for beam-steering on the uplink may be expressed as:

$$\tilde{x}_{up}(k) = \hat{K}_{ut}\tilde{v}_{ut}(k)s_{up}(k), \text{ for } k\in K, \quad \text{Eq (24)}$$

where $s_{up}(k)$ is the modulation symbol to be transmitted on the k-th subband; and $\tilde{x}_{up}(k)$ is the transmit vector for the k-th subband for beam-steering.

As shown in equation (22), the $N_{ut}$ elements of the normalized steering vector $\tilde{v}_{ut}(k)$ for each subband have equal magnitude but possibly different phases. The beam-steering thus generates one transmit vector $\tilde{x}_{up}(k)$ for each subband, with the $N_{ut}$ elements of $\tilde{x}_{up}(k)$ having the same magnitude but possibly different phases.

The received uplink transmission at the access point for beam-steering may be expressed as:

$$\begin{aligned}\tilde{r}_{up}(k) &= H_{up}(k)\tilde{x}_{up}(k) + n_{up}(k), \text{ for } k \in K, \\ &= H_{up}(k)\hat{K}_{ut}(k)\tilde{v}_{ut}(k)s_{up}(k) + n_{up}(k) \\ &= \underline{H}_{cup}(k)\tilde{v}_{ut}(k)s_{up}(k) + n_{up}(k)\end{aligned} \quad \text{Eq (25)}$$

where $\tilde{r}_{up}(k)$ is the received vector for the uplink for the k-th subband for beam-steering.

A matched filter row vector $\tilde{m}_{ap}(k)$ for the uplink transmission using beam-steering may be expressed as:

$$\tilde{m}_{ap}(k) = (\underline{H}_{cup}(k)\tilde{v}_{ut}(k))^H, \text{ for } k\in K. \quad \text{Eq (26)}$$

The matched filter vector $\tilde{m}_{ap}(k)$ may be obtained as described below. The spatial processing (or matched filtering) at the access point for the received uplink transmission with beam-steering may be expressed as:

$$\begin{aligned}\hat{s}_{up}(k) &= \tilde{\lambda}_{up}^{-1}(k)\tilde{m}_{ap}(k)\tilde{r}_{up}(k) \\ &= \tilde{\lambda}_{up}^{-1}(k)\bigl(\underline{H}_{cup}(k)\tilde{v}_{ut}(k)\bigr)^H \bigl(\underline{H}_{cup}(k)\tilde{v}_{ut}(k)s_{up}(k) + \\ &\quad \underline{n}_{up}(k)\bigr), \text{ for } k \in K, \\ &= s_{up}(k) + \tilde{n}_{up}(k)\end{aligned} \quad \text{Eq (27)}$$

where $\tilde{\lambda}_{up}(k) = (H_{cup}(k)\tilde{v}_{ut}(k))^H (H_{cup}(k)\tilde{v}_{ut}(k))$ (i.e., $\tilde{\lambda}_{up}(k)$ is the inner product of $\tilde{m}_{ap}(k)$ and its conjugate transpose), $\hat{s}_{up}(k)$ is an estimate of the modulation symbol $s_{up}(k)$ transmitted by the user terminal on the uplink, and $\tilde{n}_{up}(k)$ is the post-processed noise.

B. Downlink Beam-Steering

The spatial processing by the access point for beam-steering on the downlink may be expressed as:

$$\tilde{x}_{dn}(k) = \hat{K}_{ap}\tilde{u}_{ap}(k)s_{dn}(k), \text{ for } k\in K, \quad \text{Eq (28)}$$

where $\tilde{u}_{ap}(k)$ is the normalized eigenvector for the k-th subband, which is generated based on the eigenvector $\hat{u}_{ap,1ap,1}^*(k)$, for the principal wideband eigenmode, as described above.

A matched filter row vector $\tilde{m}_{ut}(k)$ for the downlink transmission using beam-steering may be expressed as:

$$\tilde{m}_{ut}(k) = (H_{cdn}(k)\tilde{u}_{ap}(k))^H, \text{ for } k \in K. \quad \text{Eq (29)}$$

The spatial processing (or matched filtering) at the user terminal for the received downlink transmission may be expressed as:

$$\hat{s}_{dn}(k) = \tilde{\lambda}_{dn}^{-1}(k)\tilde{m}_{ut}(k)\tilde{r}_{dn}(k) \quad \text{Eq (30)}$$

$$= \tilde{\lambda}_{dn}^{-1}(k)\left(H_{cdn}(k)\tilde{u}_{ap}(k)\right)^H \left(H_{cdn}(k)\tilde{u}_{ap}(k)s_{up}(k) + \underline{n}_{dn}(k)\right), \text{ for } k \in K,$$

$$= s_{dn}(k) + \tilde{n}_{dn}(k)$$

where $\tilde{\lambda}_{dn}(k) = (H_{cdn}(k)\tilde{u}_{ap}(k))^H (H_{cdn}(k)\tilde{u}_{ap}(k))$ (i.e., $\tilde{\lambda}_{dn}(k)$ is the inner product of $\tilde{m}_{ut}(k)$ and its conjugate transpose).

Beam-steering may be viewed as a special case of spatial processing in which only one eigenvector for one eigenmode is used for data transmission and this eigenvector is normalized to have equal magnitudes.

Figure 4:
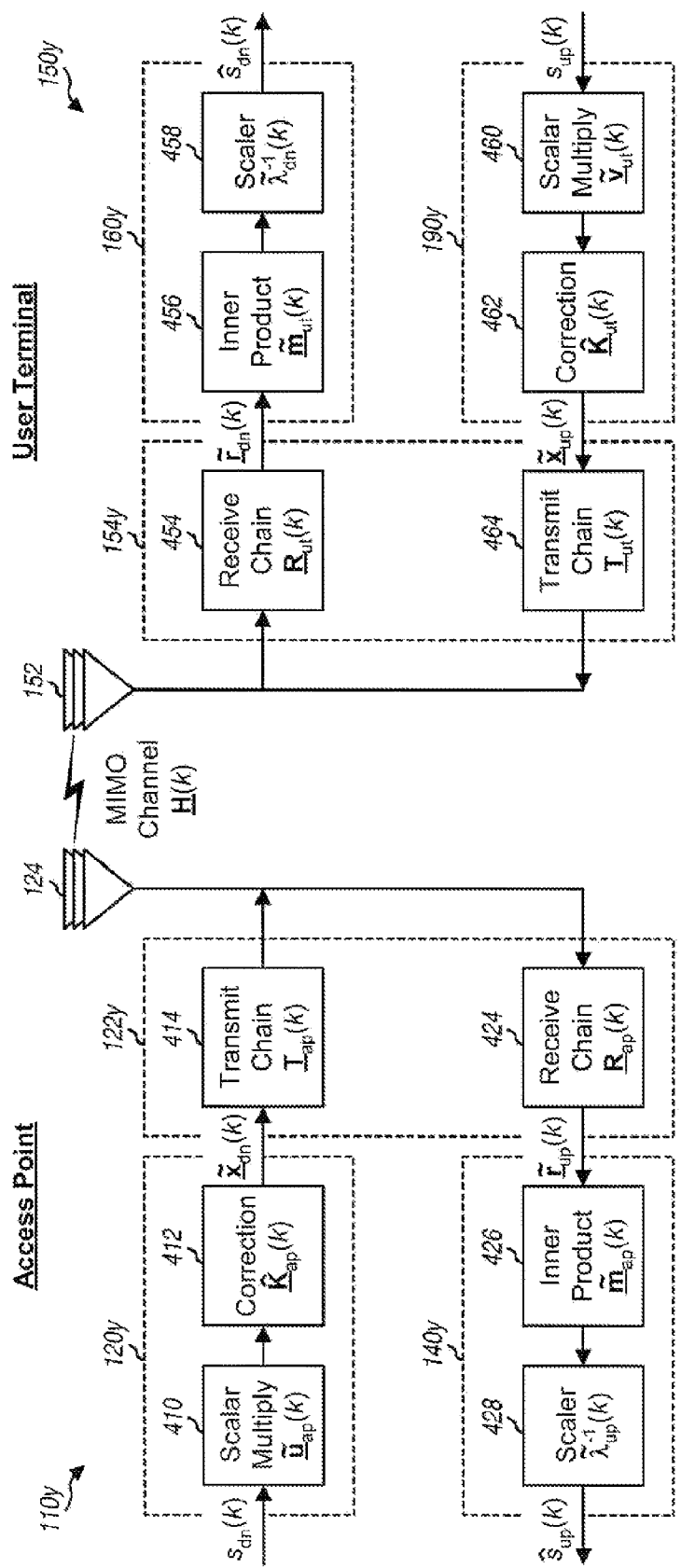
FIG. 4 shows the spatial processing for the downlink and uplink for a beam-steering mode, in accordance with one embodiment of the invention.

FIG. 4 is a block diagram of the spatial processing for the downlink and uplink for the beam-steering mode, in accordance with one embodiment of the invention.

For the downlink, within a TX spatial processor 120y at access point 110y, the modulation symbol $s_{dn}(k)$, for $k \in K$, is first multiplied with the normalized eigenvector $\tilde{u}_{ap}(k)$ by a unit 410 and then further multiplied with the correction matrix $\hat{K}_{ap}(k)$ by a unit 412 to obtain the transmit vector $\tilde{x}_{dn}(k)$. The vector $\tilde{x}_{dn}(k)$, for $k \in K$, is then processed by a transmit chain 414 within modulator 122y and transmitted over the MIMO channel to user terminal 150y. Unit 410 performs spatial processing for the downlink data transmission for the beam-steering mode.

At user terminal 150y, the downlink signals are processed by a receive chain 454 within demodulator 154y to obtain the receive vector $\tilde{r}_{dn}(k)$, for $k \in K$. Within an RX spatial processor 160y, a unit 456 performs an inner product of the receive vector $\tilde{r}_{dn}(k)$, for $k \in K$, with the matched filter vector $\tilde{m}_{ut}(k)$. The inner product result is then scaled by $\tilde{\lambda}_{dn}^{-1}(k)$ by a unit 458 to obtain the symbol $\hat{s}_{dn}(k)$, which is an estimate of the modulation symbol $s_{dn}(k)$. Units 456 and 458 perform spatial processing for the downlink matched filtering for the beam-steering mode.

For the uplink, within a TX spatial processor 190y at user terminal 150y, the modulation symbol $s_{up}(k)$, for $k \in K$, is first multiplied with the normalized eigenvector $\tilde{v}_{ut}(k)$ by a unit 460 and then further multiplied with the correction matrix $\hat{K}_{ut}(k)$ by a unit 462 to obtain the transmit vector $\tilde{x}_{up}(k)$. The vector $\tilde{x}_{up}(k)$, for $k \in K$, is then processed by a transmit chain 464 within modulator 154y and transmitted over the MIMO channel to access point 110y. Unit 460 performs spatial processing for the uplink data transmission for the beam-steering mode.

At access point 110y, the uplink signals are processed by a receive chain 424 within demodulator 124y to obtain the receive vector $\tilde{r}_{up}(k)$, for $k \in K$. Within an RX spatial processor 140y, a unit 426 performs an inner product of the receive vector $\tilde{r}_{up}(k)$, for $k \in K$, with the matched filter vector $\tilde{m}_{ap}(k)$. The inner product result is then scaled by $\tilde{\lambda}_{up}^{-1}(k)$ by a unit 428 to obtain the symbol $\hat{s}_{up}(k)$, which is an estimate of the modulation symbol $s_{up}(k)$. Units 426 and 428 perform spatial processing for the uplink matched filtering for the beam-steering mode.

4. Steered Reference

As shown in equation (15), at the access point, the received uplink vector $r_{up}(k)$, for $k \in K$, in the absence of noise is equal to the data vector $s_{up}(k)$ transformed by $\hat{U}_{ap}(k)\hat{\Sigma}(k)$, which is the matrix $\hat{U}_{ap}(k)$ of left eigenvectors of $\hat{H}_{cup}(k)$ scaled by the diagonal matrix $\hat{\Sigma}(k)$ of singular values. As shown in equations (17) and (18), because of the reciprocal channel and the calibration, the matrix $\hat{U}_{ap}^*(k)$ and its transpose are used for spatial processing of the downlink transmission and spatial processing (matched filtering) of the received uplink transmission, respectively.

A steered reference (or steered pilot) may be transmitted by the user terminal and used by the access point to obtain estimates of both $\hat{U}_{ap}(k)$ and $\hat{\Sigma}(k)$, for $k \in K$, without having to estimate the MIMO channel or perform the singular value decomposition. Similarly, a steered reference may be transmitted by the access point and used by the user terminal to obtain estimates of both $\hat{V}_{ut}(k)$ and $\hat{\Sigma}(k)$.

A steered reference comprises a specific OFDM symbol (which is referred to as a pilot or "P" OFDM symbol) that is transmitted from all of the $N_{ut}$ antennas at the user terminal (for the uplink) or the $N_{ap}$ antennas at the access point (for the downlink). The P OFDM symbol is transmitted on only one wideband eigenmode by performing spatial processing with the set of eigenvectors for that wideband eigenmode.

A. Uplink Steered Reference

An uplink steered reference transmitted by the user terminal may be expressed as:

$$x_{up,m}(k) = \hat{K}_{ut}(k)\hat{v}_{ut,m}(k)p(k), \text{ for } k \in K, \quad \text{Eq (31)}$$

where $x_{up,m}(k)$ is the transmit vector for the k-th subband of the m-th wideband eigenmode;

$\hat{v}_{ut,m}(k)$ is the eigenvector for the k-th subband of the m-th wideband eigenmode; and p(k) is a pilot modulation symbol to be transmitted on the k-th subband.

The eigenvector $\hat{v}_{ut,m}(k)$ is the m-th column of the matrix $\hat{V}_{ut}(k)$, where $\hat{V}_{ut}(k) = [\hat{v}_{ut,1}(k) \; \hat{v}_{ut,2}(k) \; \ldots \; \hat{v}_{ut,N_{ut}}(k)]$.

The received uplink steered reference at the access point may be expressed as:

$$r_{up,m}(k) = H_{up}(k)x_{up,m}(k) + \underline{n}_{up}(k), \text{ for } k \in K. \quad \text{Eq (32)}$$

$$= H_{up}(k)\hat{K}_{ut}(k)\hat{v}_{ut,m}(k)p(k) + \underline{n}_{up}(k)$$

$$\approx \hat{H}_{cup}(k)\hat{v}_{ut,m}(k)p(k) + \underline{n}_{up}(k)$$

$$= \hat{\underline{U}}_{ap}(k)\sum(k)\hat{\underline{V}}_{ut}^H(k)\hat{v}_{ut,m}(k)p(k) + \underline{n}_{up}(k)$$

$$= \hat{\underline{u}}_{ap,m}(k)\sigma_m(k)p(k) + \underline{n}_{up}(k)$$

where $r_{up,m}(k)$ is the received vector for the uplink steered reference for the k-th subband of the m-th wideband eigenmode; and $\sigma_m(k)$ is the singular value for the k-th subband of the m-th wideband eigenmode.

Techniques to estimate the channel response based on the steered reference are described in further detail below.

B. Downlink Steered Reference

A downlink steered reference transmitted by the access point may be expressed as:

$$x_{dn,m}(k) = \hat{K}_{ap}(k)\hat{u}_{ap,m}^*(k)p(k), \text{ for } k \in K, \quad \text{Eq (33)}$$

where $x_{dn,m}(k)$ is the transmit vector for the k-th subband of the m-th wideband eigenmode; and $\hat{u}_{ap,m}(k)$ is the eigenvector for the k-th subband of the m-th wideband eigenmode.

The steering vector $\hat{u}_{ap,m}^*(k)$ is the m-th column of the matrix $\hat{U}_{ap}^*(k)$, where $\hat{U}_{ap}^*(k) = [\hat{u}_{ap,1}^*(k)\hat{u}_{ap,2}(k) \ldots \hat{u}_{ap,N_{ap}}^*(k)]$.

The downlink steered reference may be used by the user terminal for various purposes. For example, the downlink steered reference allows the user terminal to determine what kind of estimate the access point has for the MIMO channel (since the access point has an estimate of an estimate of the channel). The downlink steered reference may also be used by the user terminal to estimate the received SNR of downlink transmission.

C. Steered Reference for Beam-Steering

For the beam-steering mode, the spatial processing on the transmit side is performed using a set of normalized eigenvectors for the principal wideband eigenmode. The overall transfer function with a normalized eigenvector is different from the overall transfer function with an unnormalized eigenvector (i.e., $H_{cup}(k)\hat{v}_{ut,1}(k) \neq H_{cup}(k)\tilde{v}_{ut}(k)$). A steered reference generated using the set of normalized eigenvectors for all subbands may then be sent by the transmitter and used by the receiver to derive the matched filter vectors for these subbands for the beam-steering mode.

For the uplink, the steered reference for the beam-steering mode may be expressed as:

$$\tilde{x}_{up,sr}(k) = \hat{K}_{ut}(k)\tilde{v}_{ut}(k)p(k), \text{ for } k \in K. \quad \text{Eq (34)}$$

At the access point, the receive uplink steered reference for the beam-steering mode may be expressed as:

$$\begin{aligned}\tilde{r}_{up,sr}(k) &= \underline{H}_{up}(k)\underline{x}_{up,sr}(k) + \underline{n}_{up}(k), \text{ for } k \in K. \quad \text{Eq (35)}\\&= \underline{H}_{up}(k)\hat{\underline{K}}_{ut}(k)\tilde{\underline{v}}_{ut}(k)p(k) + \underline{n}_{up}(k)\\&= H_{cup}(k)\tilde{\underline{v}}_{ut}(k)p(k) + \underline{n}_{up}(k)\end{aligned}$$

To obtain the matched filter row vector $\tilde{m}_{ap}(k)$ for the uplink transmission with beam-steering, the received vector $\tilde{r}_{up,sr}(k)$ for the steered reference is first multiplied with $p^*(k)$. The result is then integrated over multiple received steered reference symbols to form an estimate of $H_{cup}(k)\tilde{v}_{ut}(k)$. The vector $\tilde{m}_{ap}(k)$ is then the conjugate transpose of this estimate.

While operating in the beam-steering mode, the user terminal may transmit multiple symbols of steered reference, for example, one or more symbols using the normalized eigenvector $\tilde{v}_{ut}(k)$, one or more symbols using the eigenvector $\hat{v}_{ut,1}(k)$ for the principal eigenmode, and possibly one or more symbols using the eigenvectors for the other eigenmodes. The steered reference symbols generated with $\tilde{v}_{ut}(k)$ may be used by the access point to derive the matched filter vector $\tilde{m}_{ap}(k)$. The steered reference symbols generated with $\hat{v}_{ut,1}(k)$ may be used to obtain $\hat{u}_{ap,1}(k)$, which may then be used to derive the normalized eigenvector $\tilde{u}_{ap}(k)$ used for beam-steering on the downlink. The steered reference symbols generated with the eigenvectors $\hat{v}_{ut,2}(k)$ through $\hat{v}_{ut,N_s}(k)$ for the other eigenmodes may be used by the access point to obtain $\hat{u}_{ap,2}(k)$ through $\hat{u}_{ap,N_s}(k)$ and the singular values for these other eigenmodes. This information may then be used by the access point to determine whether to use the spatial multiplexing mode or the beam-steering mode for data transmission.

For the downlink, the user terminal may derive the matched filter vector $\tilde{m}_{ut}(k)$ for the beam-steering mode based on the calibrated downlink channel response estimate $\hat{H}_{cdn}(k)$. In particular, the user terminal has $\hat{u}_{ap,1}(k)$ from the singular value decomposition of $\hat{H}_{cdn}(k)$ and can derive the normalized eigenvector $\tilde{u}_{ap}(k)$. The user terminal can then multiply $\tilde{u}_{ap}(k)$ with $\hat{H}_{cdn}(k)$ to obtain $\hat{H}_{cdn}(k)\tilde{u}_{ap}(k)$, and may then derive $\tilde{m}_{ut}(k)$ based on $\hat{H}_{cdn}(k)\tilde{u}_{ap}(k)$. Alternatively, a steered reference may be sent by the access point using the normalized eigenvector $\tilde{u}_{ap}(k)$, and this steered reference may be processed by the user terminal in the manner described above to obtain $\tilde{m}_{ut}(k)$.

D. Channel Estimation Based on Steered Reference

As shown in equation (32), at the access point, the received uplink steered reference (in the absence of noise) is approximately $\hat{u}_{ap,m}(k)\sigma_m(k)p(k)$. The access point can thus obtain an estimate of the uplink channel response based on the steered reference sent by the user terminal. Various estimation techniques may be used to obtain the channel response estimate.

In one embodiment, to obtain an estimate of $\hat{u}_{ap,m}(k)$, the received vector $r_{up,m}(k)$ for the steered reference for the m-th wideband eigenmode is first multiplied with the complex conjugate of the pilot modulation symbol, $p^*(k)$, used for the steered reference. The result is then integrated over multiple received steered reference symbols for each wideband eigenmode to obtain an estimate of $\hat{u}_{ap,m}(k)\sigma_m(k)$, which is a scaled left eigenvector of $\hat{H}_{cup}(k)$ for the m-th wideband eigenmode. Each of the $N_{ap}$ entries of $\hat{u}_{ap,m}(k)$ is obtained based on a corresponding one of the $N_{ap}$ entries for $r_{up,m}(k)$, where the $N_{ap}$ entries of $r_{up,m}(k)$ are the received symbols obtained from the $N_{ap}$ antennas at the access point. Since eigenvectors have unit power, the singular value $\sigma_m(k)$ may be estimated based on the received power of the steered reference, which can be measured for each subband of each wideband eigenmode.

In another embodiment, a minimum mean square error (MMSE) technique is used to obtain an estimate of $\hat{u}_{ap,m}(k)$ based on the received vector $r_{up,m}(k)$ for the steered reference. Since the pilot modulation symbols $p(k)$ are known, the access point can derive the estimate of $\hat{u}_{ap,m}(k)$ such that the mean square error between the received pilot symbols (obtained after performing the matched filtering on the received vector $r_{up,m}(k)$) and the transmitted pilot symbols is minimized. The use of the MMSE technique for spatial processing at the receiver is described in detail in commonly assigned U.S. patent application Ser. No. 09/993,087, entitled "Multiple-Access Multiple-Input Multiple-Output (MIMO) Communication System," filed Nov. 6, 2001.

The steered reference is sent for one wideband eigenmode in any given symbol period, and may in turn be used to obtain an estimate of one eigenvector for each subband of that wideband eigenmode. Thus, the receiver is able to obtain an estimate of one eigenvector in a unitary matrix for any given symbol period. Since estimates of multiple eigenvectors for the unitary matrix are obtained over different symbol periods, and due to noise and other sources of degradation in the transmission path, the estimated eigenvectors for the unitary matrix are not likely be orthogonal. If the estimated eigenvectors are thereafter used for spatial processing of data transmission on the other link, then any errors in orthogonality in these estimated eigenvectors would result in cross-talk among the eigenmodes, which may degrade performance.

In an embodiment, the estimated eigenvectors for each unitary matrix are forced to be orthogonal to each other. The orthogonalization of the eigenvectors may be achieved using the Gram-Schmidt technique, which is described in detail in the aforementioned reference from Gilbert Strang, or some other technique.

Other techniques to estimate the channel response based on the steered reference may also be used, and this is within the scope of the invention.

The access point can thus estimate both $\hat{U}_{ap}(k)$ and $\hat{\Sigma}(k)$ based on the steered reference sent by the user terminal, without having to estimate the uplink channel response or perform singular value decomposition on $\hat{H}_{cup}(k)$. Since only $N_{ut}$ wideband eigenmodes have any power, the matrix $\hat{U}_{ap}(k)$ of left eigenvectors of $\hat{H}_{cup}(k)$ is effectively ($N_{ap} \times N_{ut}$), and the matrix $\hat{\Sigma}(k)$ may be considered to be ($N_{ut} \times N_{ut}$).

The processing at the user terminal to estimate the matrices $\hat{V}_{ut}(k)$ and $\hat{\Sigma}(k)$, for $k \in K$, based on the downlink steered reference may be performed similar to that described above for the uplink steered reference.

5. Channel Estimation and Spatial Processing

Figure 5:
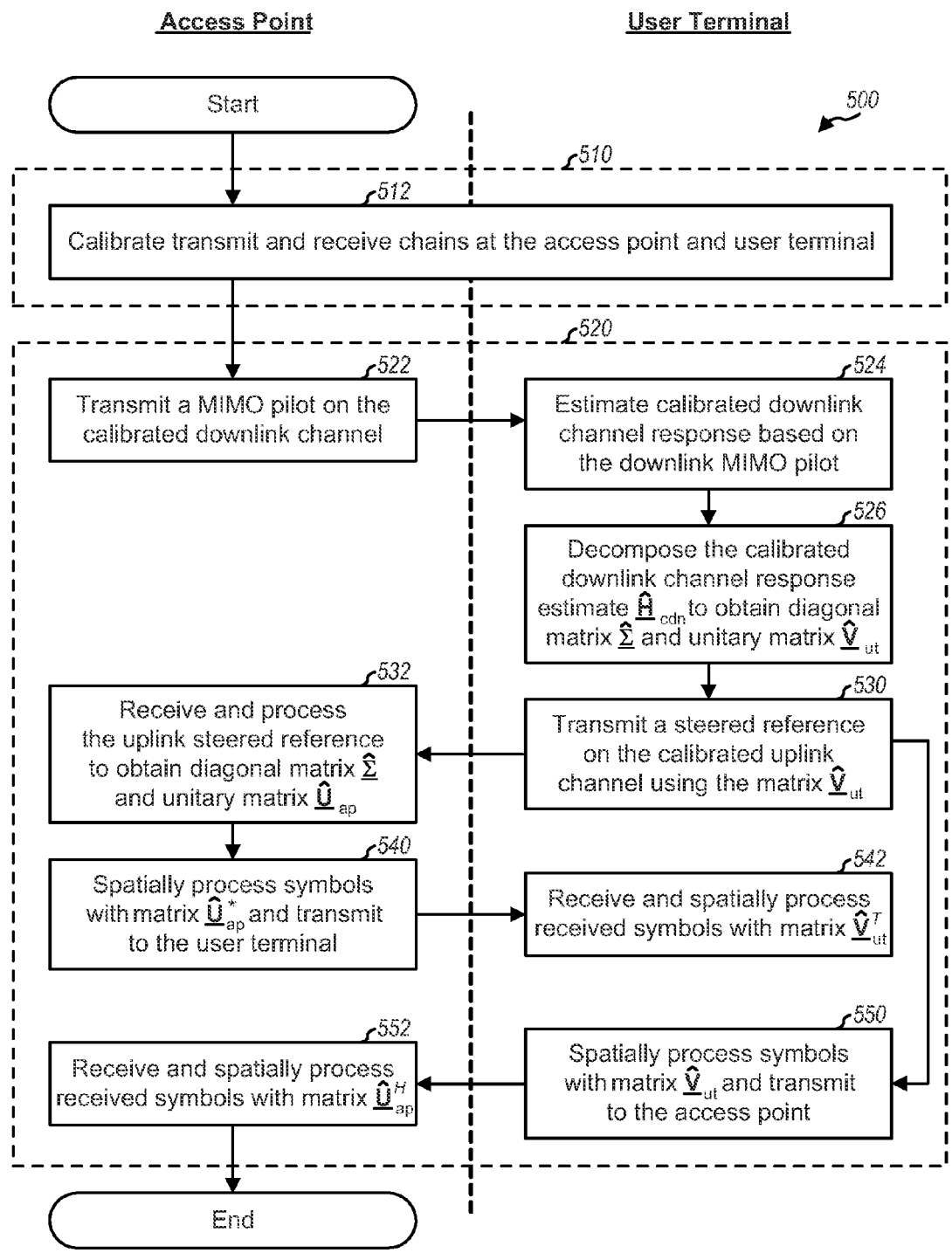
FIG. 5 shows a process for performing channel estimation and spatial processing at the access point and user terminal, in accordance with one embodiment of the invention.

FIG. 5 is a flow diagram of a specific embodiment of a process 500 for performing channel estimation and spatial processing at the access point and user terminal, in accordance with one embodiment of the invention. Process 500 includes two parts—calibration (block 510) and normal operation (block 520).

Initially, the access point and user terminal perform calibration to determine the differences in the responses of their transmit and receive chains and to obtain correction matrices $\hat{K}_{ap}(k)$ and $\hat{K}_{ut}(k)$, for $k \in K$ (at block 512). The calibration only needs to be performed once (e.g., at the start of a communication session, or the very first time the user terminal is powered up). The correction matrices $\hat{K}_{ap}(k)$ and $\hat{K}_{ut}(k)$ are thereafter used by the access point and user terminal, respectively, on the transmit side as described above.

During normal operation, the access point transmits a MIMO pilot on the calibrated downlink channel (at block 522). The user terminal receives and processes the MIMO pilot, estimates the calibrated downlink channel response based on the received MIMO pilot, and maintains an estimate of the calibrated downlink channel response (at block 524). It can be shown that performance is better (i.e., less degradation) when the channel response estimate is accurate. An accurate channel response estimate may be obtained by averaging the estimates derived from multiple received MIMO pilot transmissions.

The user terminal then decomposes the calibrated downlink channel response estimate, $\hat{H}_{cdn}(k)$, for $k \in K$, to obtain the diagonal matrix $\hat{\Sigma}(k)$ and the unitary matrix $\hat{V}_{ut}^*(k)$ (at block 526). The matrix $\hat{V}_{ut}^*(k)$ contains the left eigenvectors of $\hat{H}_{cdn}(k)$ and $\hat{V}_{ut}(k)$ contains the right eigenvectors of $\hat{H}_{cup}(k)$. The matrix $\hat{V}_{ut}(k)$ can thus be used by the user terminal to perform spatial processing for data transmission received on the downlink as well as for data transmission to be sent on the uplink.

The user terminal then transmits a steered reference on the uplink to the access point using the eigenvectors in the matrix $\hat{V}_{ut}(k)$, as shown in equation (31) (at block 530). The access point receives and processes the uplink steered reference to obtain the diagonal matrix $\hat{\Sigma}(k)$ and the unitary matrix $\hat{U}_{ap}(k)$, for $k \in K$ (at block 532). The matrix $\hat{U}_{ap}(k)$ contains the left eigenvectors of $\hat{H}_{cup}(k)$ and $\hat{U}_{ap}(k)$ contains the right eigenvectors of $\hat{H}_{cdn}(k)$. The matrix $\hat{U}_{ap}(k)$ can thus be used by the access point to perform spatial processing for data transmission received on the uplink as well as for data transmission to be sent on the downlink.

The matrix $\hat{U}_{ap}(k)$, for $k \in K$, is obtained based on an estimate of the uplink steered reference, which in turn is generated with the eigenvector that is obtained based on an estimate of the calibrated downlink channel response. Thus, the matrix $\hat{U}_{ap}(k)$ is effectively an estimate of an estimate. The access point may average the uplink steered reference transmissions to obtain more accurate estimate of the actual matrix $U_{ap}(k)$.

Once the user terminal and access point obtain the matrices $\hat{V}_{ut}(k)$ and $\hat{U}_{ap}(k)$, respectively, data transmission can commence on the downlink and/or uplink. For downlink data transmission, the access point performs spatial processing on symbols with the matrix $\hat{U}_{ap}^*(k)$ of right eigenvectors of $\hat{H}_{cdn}(k)$ and transmits to the user terminal (at block 540). The user terminal would then receive and spatially process the downlink data transmission with the matrix $\hat{V}_{ut}^T(k)$, which is the conjugate transpose of the matrix $\hat{V}_{ut}^*(k)$ of left eigenvectors of $\hat{H}_{cdn}(k)$ (at block 542). For uplink data transmission, the user terminal performs spatial processing on symbols with the matrix $\hat{V}_{ut}(k)$ of right eigenvectors of $\hat{H}_{cup}(k)$, and transmits to the access point (at block 550). The access point would then receive and spatially process the uplink data transmission with the matrix $\hat{U}_{ap}^H(k)$, which is the conjugate transpose of the matrix $\hat{U}_{ap}(k)$ of left eigenvectors of $\hat{H}_{cup}(k)$ (at block 552).

The downlink and/or uplink data transmission can continue until terminated by either the access point or user terminal. While the user terminal is idle (i.e., with no data to transmit or receive), the MIMO pilot and/or steered reference may still be sent to allow the access point and user terminal to maintain up-to-date estimates of the downlink and uplink channel responses, respectively. This would then allow data transmission to commence quickly, if and when resumed.

For clarity, the channel estimation and spatial processing techniques have been described for a specific embodiment in which the user terminal estimates the calibrated downlink channel response based on a downlink MIMO pilot and performs the singular value decomposition. The channel estimation and singular value decomposition may also be performed by the access point, and this is within the scope of the invention. In general, because of the reciprocal channel for a TDD system, the channel estimation needs only be performed at one end of the link.

The techniques described herein may be used with or without calibration. Calibration may be performed to improve the channel estimates, which may then improve system performance.

The techniques described herein may also be used in conjunction with other spatial processing techniques, such as water-filling for transmit power allocation among the wideband eigenmodes and channel inversion for transmit power allocation among the subbands of each wideband eigenmode. Channel inversion and water-filling are described in the aforementioned U.S. Patent Application Ser. No. 60/421,309.

The channel estimation and spatial processing techniques described herein may be implemented by various means. For example, these techniques may be implemented in hardware, software, or a combination thereof. For a hardware implementation, the elements used to implement the techniques described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the channel estimation and spatial processing techniques may be implemented with modules (e.g., procedures, functions, and so on) that perform the functions described herein. The software codes may be stored in a memory unit (e.g., memory units 132 and 182 in FIG. 1) and executed by a processor (e.g., controllers 130 and 180). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing spatial processing in a wireless time division duplexed (TDD) multiple-input multiple-output (MIMO) communication system, comprising:

processing a MIMO pilot received via a first link to obtain a plurality of eigenvectors usable for spatial processing for both data transmission received via the first link and data transmission sent via a second link, wherein the MIMO pilot comprises a plurality of pilot transmissions sent from a plurality of transmit antennas, and wherein the pilot transmission from each transmit antenna is identifiable by a receiver of the MIMO pilot;

performing spatial processing on a first data transmission received via the first link with the plurality of eigenvectors to recover data symbols for the first data transmission; and performing spatial processing for a second data transmission with the plurality of eigenvectors prior to transmission over the second link.

2. The method of claim 1, further comprising:

performing spatial processing on pilot symbols with at least one of the eigenvectors to generate a steered pilot for transmission on at least one eigenmode of a MIMO channel for the second link.

3. The method of claim 1, further comprising:

performing calibration to obtain correction factors; and scaling the second data transmission with the correction factors prior to transmission over the second link.

4. The method of claim 1, wherein the TDD MIMO communication system utilizes orthogonal frequency division multiplexing (OFDM), and wherein the spatial processing is performed for each of a plurality of subbands.

5. An apparatus in a wireless time division duplexed (TDD) multiple-input multiple-output (MIMO) communication system, comprising:

means for processing a MIMO pilot received via a first link to obtain a plurality of eigenvectors usable for spatial processing for both data transmission received via the first link and data transmission sent via a second link, wherein the MIMO pilot comprises a plurality of pilot transmissions sent from a plurality of transmit antennas, and wherein the pilot transmission from each transmit antenna is identifiable by a receiver of the MIMO pilot;

means for performing spatial processing on a first data transmission received via the first link with the plurality of eigenvectors to recover data symbols for the first data transmission; and means for performing spatial processing for a second data transmission with the plurality of eigenvectors prior to transmission over the second link.

6. The apparatus of claim 5, further comprising:

means for performing spatial processing on pilot symbols with at least one of the eigenvectors to generate a steered pilot for transmission on at least one eigenmode of a MIMO channel for the second link.

7. The apparatus of claim 5, further comprising:

means for performing calibration to obtain correction factors; and means for scaling the second data transmission with the correction factors prior to transmission over the second link.

8. An apparatus in a wireless time division duplexed (TDD) multiple-input multiple-output (MIMO) communication system, comprising:

a controller operative to process a MIMO pilot received via a first link to obtain a plurality of eigenvectors usable for spatial processing for both data transmission received via the first link and data transmission sent via a second link, wherein the MIMO pilot comprises a plurality of pilot transmissions sent from a plurality of transmit antennas, and wherein the pilot transmission from each transmit antenna is identifiable by a receiver of the MIMO pilot;

a receive spatial processor operative to perform spatial processing on a first data transmission received via the first link with the plurality of eigenvectors to recover data symbols for the first data transmission; and a transmit spatial processor operative to perform spatial processing for a second data transmission with the plurality of eigenvectors prior to transmission over the second link.

9. The apparatus of claim 8, wherein the transmit spatial processor is further operative to perform spatial processing on pilot symbols with at least one of the eigenvectors to generate a steered pilot for transmission on at least one eigenmode of a MIMO channel for the second link.

10. The apparatus of claim 8, wherein the controller is further operative to perform calibration to obtain correction factors, and wherein the transmit spatial processor is further operative to scale the second data transmission with the correction factors prior to transmission over the second link.

11. A method of performing spatial processing in a wireless time division duplexed (TDD) multiple-input multiple-output (MIMO) communication system, comprising:

processing a steered pilot received via at least one eigenmode of a MIMO channel for a first link to obtain at least one eigenvector usable for spatial processing for both data transmission received via the first link and data transmission sent via a second link;

performing spatial processing on a first data transmission received via the first link with the at least one eigenvector; and performing spatial processing for a second data transmission with the at least one eigenvector prior to transmission over the second link.

12. The method of claim 11, further comprising:

generating a MIMO pilot for transmission over the second link, wherein the MIMO pilot comprises a plurality of pilot transmissions sent from a plurality of transmit antennas, and wherein the pilot transmission from each transmit antenna is identifiable by a receiver of the MIMO pilot.

13. An apparatus in a wireless time division duplexed (TDD) multiple-input multiple-output (MIMO) communication system, comprising:
means for processing a steered pilot received via at least one eigenmode of a MIMO channel for a first link to obtain at least one eigenvector usable for spatial processing for both data transmission received via the first link and data transmission sent via a second link;
means for performing spatial processing on a first data transmission received via the first link with the at least one eigenvector; and
means for performing spatial processing for a second data transmission with the at least one eigenvector prior to transmission over the second link.

14. The apparatus of claim 13, further comprising:
means for generating a MIMO pilot for transmission over the second link,
wherein the MIMO pilot comprises a plurality of pilot transmissions sent from a plurality of transmit antennas, and wherein the pilot transmission from each transmit antenna is identifiable by a receiver of the MIMO pilot.

15. An apparatus in a wireless time division duplexed (TDD) multiple-input multiple-output (MIMO) communication system, comprising:
a controller operative to process a steered pilot received via at least one eigenmode of a MIMO channel for a first link to obtain at least one eigenvector usable for spatial processing for both data transmission received via the first link and data transmission sent via a second link;
a receive spatial processor operative to perform spatial processing on a first data transmission received via the first link with the at least one eigenvector; and
a transmit spatial processor operative to perform spatial processing for a second data transmission with the at least one eigenvector prior to transmission over the second link.

16. The apparatus of claim 15, wherein the transmit spatial processor is further operative to generate a MIMO pilot for transmission over the second link, wherein the MIMO pilot comprises a plurality of pilot transmissions sent from a plurality of transmit antennas, and
wherein the pilot transmission from each transmit antenna is identifiable by a receiver of the MIMO pilot.

17. A method of performing spatial processing in a wireless time division duplexed (TDD) multiple-input multiple-output (MIMO) orthogonal frequency division multiplexing (OFDM) communication system, comprising:
processing a first transmission received via a first link to obtain a matrix of eigenvectors for each of a plurality of subbands, wherein a plurality of matrices of eigenvectors are obtained for the plurality of subbands and are usable for spatial processing for both data transmission received via the first link and data transmission sent via a second link; and
performing spatial processing for a second transmission with the plurality of matrices of eigenvectors prior to transmission over the second link.

18. The method of claim 17, further comprising:
ordering the eigenvectors in each matrix based on channel gains associated with the eigenvectors.

19. The method of claim 18, wherein the second transmission is sent on at least one wideband eigenmode, each wideband eigenmode associated with a set of eigenvectors in the plurality of matrices having same order after the ordering.

20. A method of estimating a wireless channel in a time division duplexed (TDD) multiple-input multiple-output (MIMO) communication system, comprising:
processing a pilot transmission received via a first link to obtain a channel response estimate for the first link; and
decomposing the channel response estimate to obtain a matrix of eigenvectors usable for spatial processing for both data transmission received via the first link and data transmission sent via a second link.

21. A method of estimating a wireless channel in a time division duplexed (TDD) multiple-input multiple-output (MIMO) communication system, comprising:
receiving a steered pilot on at least one eigenmode of a MIMO channel for a first link; and
processing the received steered pilot to obtain at least one eigenvector usable for spatial processing for both data transmission received via the first link and data transmission sent via a second link.

22. The method of claim 21, wherein the processing includes
demodulating the received steered pilot to remove modulation due to pilot symbols used to generate the steered pilot, and
processing the demodulated steered pilot to obtain the at least one eigenvector.

23. The method of claim 21, wherein the at least one eigenvector is obtained based on a minimum mean square error (MMSE) technique.

24. The method of claim 21, wherein a plurality of eigenvectors are obtained and are forced to be orthogonal to one another.

25. A method for performing data processing in a wireless communication system including an access point and a user terminal, the method comprising:
calibrating one or more communication links including a first link and a second link between the access point and the user terminal to form a calibrated first link and a calibrated second link;
obtaining a channel response estimate for the calibrated first link based on one or more pilots transmitted on the calibrated first link; and
decomposing the channel response estimate to obtain one or more eigenvectors usable for spatial processing of the one or more communication links.

26. The method of claim 25 wherein calibrating comprises:
determining one or more sets of correction factors based on estimates of channel responses for the one or more communication links; and
applying the one or more sets of correction factors to the first and second links to form the calibrated first and second links.

27. The method of claim 25 further comprising:
performing spatial processing for data transmissions on the first and second links using the one or more eigenvectors obtained from decomposing the channel response estimate for the calibrated first link.

28. The method of claim 27 wherein performing spatial processing comprises:
transmitting a steered reference on the second link using the one or more eigenvectors.

29. The method of claim 28 further comprising:
performing spatial processing on or more pilot symbols with the one or more eigenvectors to generate the steered reference.

30. An apparatus for performing data processing in a wireless communication system including an access point and a user terminal, the apparatus comprising:

means for calibrating one or more communication links including a first link and a second link between the access point and the user terminal to form a calibrated first link and a calibrated second link;

means for obtaining a channel response estimate for the calibrated first link based on one or more pilots transmitted on the calibrated first link; and means for decomposing the channel response estimate to obtain one or more eigenvectors usable for spatial processing of the one or more communication links.

31. The apparatus of claim 30 wherein calibrating comprises:

means for determining one or more sets of correction factors based on estimates of channel responses for the one or more communication links; and means for applying the one or more sets of correction factors to the first and second links to form the calibrated first and second links.

32. The apparatus of claim 30 further comprising:

performing spatial processing for data transmissions on the first and second links using the one or more eigenvectors obtained from decomposing the channel response estimate for the calibrated first link.

33. The apparatus of claim 32 wherein performing spatial processing comprises:

transmitting a steered reference on the second link using the one or more eigenvectors.

34. The apparatus of claim 33 further comprising:

performing spatial processing on or more pilot symbols with the one or more eigenvectors to generate the steered reference.

35. A memory unit for storing software code, which when executed on a processor, is operable to implement the method of claim 1.

36. A memory unit for storing software code, which when executed on a processor, is operable to implement the method of claim 11.

37. A memory unit for storing software code, which when executed on a processor, is operable to implement the method of claim 17.

38. A memory unit for storing software code, which when executed on a processor, is operable to implement the method of claim 20.

39. A memory unit for storing software code, which when executed on a processor, is operable to implement the method of claim 21.

40. A memory unit for storing software code, which when executed on a processor, is operable to implement the method of claim 25.

* * * * *

UNITED STATES PATENT AND TRADEMARK OFFICE
CERTIFICATE OF CORRECTION

PATENT NO. : 7,653,142 B2
APPLICATION NO. : 11/610351
DATED : January 26, 2010
INVENTOR(S) : Ketchum et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 430 days.

Signed and Sealed this

Twenty-eighth Day of December, 2010

David J. Kappos
*Director of the United States Patent and Trademark Office*